(12) United States Patent
Zhong

(10) Patent No.: US 12,389,874 B2
(45) Date of Patent: Aug. 19, 2025

(54) PET TOILET

(71) Applicant: Shenzhen Libsix Technology Co., Ltd., Shenzhen (CN)

(72) Inventor: Xiaohang Zhong, Shenzhen (CN)

(73) Assignee: Shenzhen Libsix Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/919,457

(22) Filed: Oct. 18, 2024

(65) Prior Publication Data

US 2025/0040509 A1 Feb. 6, 2025

Related U.S. Application Data

(63) Continuation of application No. PCT/CN2023/089529, filed on Apr. 20, 2023.

(30) Foreign Application Priority Data

Apr. 21, 2022 (CN) .......................... 202210426781.5

(51) Int. Cl.
*A01K 1/01* (2006.01)

(52) U.S. Cl.
CPC .................................. *A01K 1/0114* (2013.01)

(58) Field of Classification Search
CPC ..... A01K 1/0114; A01K 1/011; A01K 1/0107
See application file for complete search history.

(56) References Cited

U.S. PATENT DOCUMENTS 11,457,604 B1 * 10/2022 Fan ...................... A01K 1/0114
2005/0172909 A1    8/2005 Emery

FOREIGN PATENT DOCUMENTS

| CN | 110521611 A | * 12/2019 | ........... A01K 1/0114 |
|---|---|---|---|
| CN | 111512975 A | 8/2020 | |
| CN | 213127522 U | 5/2021 | |
| CN | 215123037 U | 12/2021 | |
| CN | 217184271 U | 8/2022 | |
| CN | 115530079 A | 12/2022 | |
| JP | 2011120488 A | 6/2011 | |
| JP | 2019050780 A | 4/2019 | |

* cited by examiner

*Primary Examiner* — Kimberly S Berona
*Assistant Examiner* — Nevena Aleksic
(74) *Attorney, Agent, or Firm* — Birchwood IP

(57) ABSTRACT

A driving device of a pet toilet is configured to drive a litter scoop to move in a litter box to separate a litter clump from the litter box, and the driving device includes a driving force arm and a driving source component. A first end of the driving force arm is rotatably connected to the litter scoop, and an opposite second end of the driving force arm is rotatably connected to the driving source component. The first end of the driving force arm is rotatable around the driving source component to move the opposite second end between two opposite ends of the litter box, thereby driving the litter scoop through the driving force arm to separate the litter clump from the litter box. The driving source component is further configured to drive the litter scoop to be lifted and move the lifted litter scoop out of the litter box.

20 Claims, 10 Drawing Sheets

PET TOILET

CROSS REFERENCE TO THE RELATED APPLICATIONS

This application is the continuation application of International Application No. PCT/CN2023/089529, filed on Apr. 20, 2023, which is based upon and claims priority to Chinese Patent Application No. 202210426781.5, filed on Apr. 21, 2022, the entire contents of which are incorporated herein by reference.

TECHNICAL FIELD

The present disclosure relates to the technical field of pet toilets, and in particular to a pet toilet.

BACKGROUND

Pet owners usually provide dedicated pet toilets for their pets. For example, cat toilets are provided to guide cats to excrete in a designated area. There is pet litter placed in the cat toilet, which can form a litter clump when the excrement is in a damp state, making it easy to clean the litter clump from the dry pet litter. Due to the odor of the pet excrement, the pet owner needs to timely remove the litter clump from the pet litter, otherwise the cat will not be willing to excrete in the cat toilet.

At present, commonly used cat toilets with automatic cleaning function in the industry are mainly side drum type cat toilets, which drive the litter clump through a filter screen by rotating a litter container, thereby separating the pet litter and the litter clump. However, the side drum type cat toilet requires flipping the cat litter mixed with the litter clump, making the inner wall of the cat toilet easily contaminated with the excrement, thereby requiring regular cleaning of the inner wall of the cat toilet.

SUMMARY

In view of this, it is necessary to provide a pet toilet to solve the problem that the inner wall of the side drum type cat toilet is easily contaminated with excrement. In the present disclosure, a litter scoop driving device drives a litter scoop to move inside a litter box so as to remove a litter clump from the litter box. The pet toilet using this litter scoop driving device can separate the litter clump from a pet litter without flipping the pet litter.

A first aspect of the present invention provides a pet toilet, including:
  a litter box, configured to hold a pet litter; and
  a litter scoop driving device, located in the litter box, and configured to drive a litter scoop to move in the litter box to separate a litter clump from the litter box, where the litter scoop driving device includes a housing, a driving force arm, the litter scoop, and a guide rail; one end of the driving force arm is rotatably connected to the litter scoop, and the other opposite end of the driving force arm is rotatably connected to the housing; and the guide rail is directly or indirectly provided on the litter box.

The litter scoop driving device further includes a motor unit; the motor unit includes a first motor, a second motor, and a third motor; the first motor is located on the housing; an output end of the first motor is connected to the driving force arm to drive the driving force arm to rotate relative to the housing; the second motor is located on the housing; an output end of the second motor is connected to the guide rail; the second motor is configured to drive the litter scoop driving device to move in a length direction of the guide rail, thereby driving the litter scoop to move between two opposite ends of the litter box; the third motor is located on the driving force arm; an output end of the third motor is connected to the litter scoop to drive the litter scoop to rotate relative to the driving force arm; under the action of the first motor, the litter scoop is lifted; under the action of the second motor, the litter scoop moves from one end of the litter box to the other end of the litter box; and under the action of the third motor, the litter scoop dumps the litter clump.

A second aspect of the present invention provides a pet toilet, including:
  a litter box, configured to hold a pet litter; and
  a litter scoop driving device, located in the litter box, and configured to drive a litter scoop to move in the litter box to separate a litter clump from the litter box, where the litter scoop driving device includes a housing, a driving force arm, and the litter scoop; one end of the driving force arm is rotatably connected to the litter scoop, and the other opposite end of the driving force arm is rotatably connected to the housing; the driving force arm includes two rods that are relatively telescopic in an axial direction; and through relative telescopic motion of the two rods that are telescopic in the axial direction, an axial length of the driving force arm increases or decreases.

The litter scoop driving device further includes a motor unit; the motor unit includes a first motor and a third motor; the first motor is located on the housing; an output end of the first motor is connected to the driving force arm to drive the driving force arm to rotate relative to the housing; the third motor is located on the driving force arm; an output end of the third motor is connected to the litter scoop to drive the litter scoop to rotate relative to the driving force arm; under the action of the first motor, the litter scoop is tilted and lifted; when the litter scoop is tilted and lifted, the driving force arm extends, the litter scoop remains in abutting against a bottom of the litter box, and the litter scoop moves from one end of the litter box to the other end of the litter box; and under the action of the third motor, the litter scoop dumps the litter clump.

A third aspect of the present invention provides a pet toilet, including:
  a litter box, configured to hold a pet litter; and
  a litter scoop driving device, located in the litter box, and configured to drive a litter scoop to move in the litter box to separate a litter clump from the litter box, where the litter scoop driving device includes a housing, a driving force arm, and the litter scoop; one end of the driving force arm is rotatably connected to the litter scoop, and the other opposite end of the driving force arm is rotatably connected to the housing; the driving force arm includes two rods that are axially connected and rotatable to change an angle; and through relative rotation of the two axial rods, the litter scoop remains continuously in abutting against a bottom of the litter box.

The litter scoop driving device further includes a motor unit; the motor unit includes a first motor and a third motor; the first motor is located on the housing; an output end of the first motor is connected to the driving force arm to drive the driving force arm to rotate relative to the housing; the third motor is located on the driving force arm; an output end of the third motor is connected to the litter scoop to drive the litter scoop to rotate relative to the driving force arm; under the action of the first motor, the litter scoop is tilted and lifted; when the litter scoop is tilted and lifted, the angle between the two rods changes, the litter scoop remains in abutting against the bottom of the litter box, and the litter scoop moves from one end of the litter box to the other end of the litter box; and under the action of the third motor, the litter scoop dumps the litter clump.

In the above pet toilet, the litter scoop is driven to move between the two opposite ends of the litter box to achieve the separation of the pet litter and the litter clump in the litter box, thereby completing the automatic cleaning of the pet toilet. The pet toilet can achieve automatic cleaning without flipping the litter box, so the side wall of the pet toilet is not easily contaminated with excrement. In addition, the litter scoop driving device uses a lifting method to move the litter scoop out of the litter box, reducing odors of the dumped litter clump moving to the litter box to affect pet excretion. In addition, since the driving force arm, the housing, and the litter scoop are all rotatably connected, the litter scoop can move to any position in the litter box. The design achieves high overall freedom and is suitable for various usage scenarios. For example, when the pet excretes, the litter scoop and the driving force arm is moved to a position above the litter box, without occupying the space for the pet to use in the litter box, reducing the impact of the litter scoop and the driving force arm on pet excretion. When the pet toilet starts automatically cleaning the litter clump, the litter scoop can clean various positions inside the litter box, reducing the probability of residual litter clumps and achieving thorough cleaning.

Figure 1:
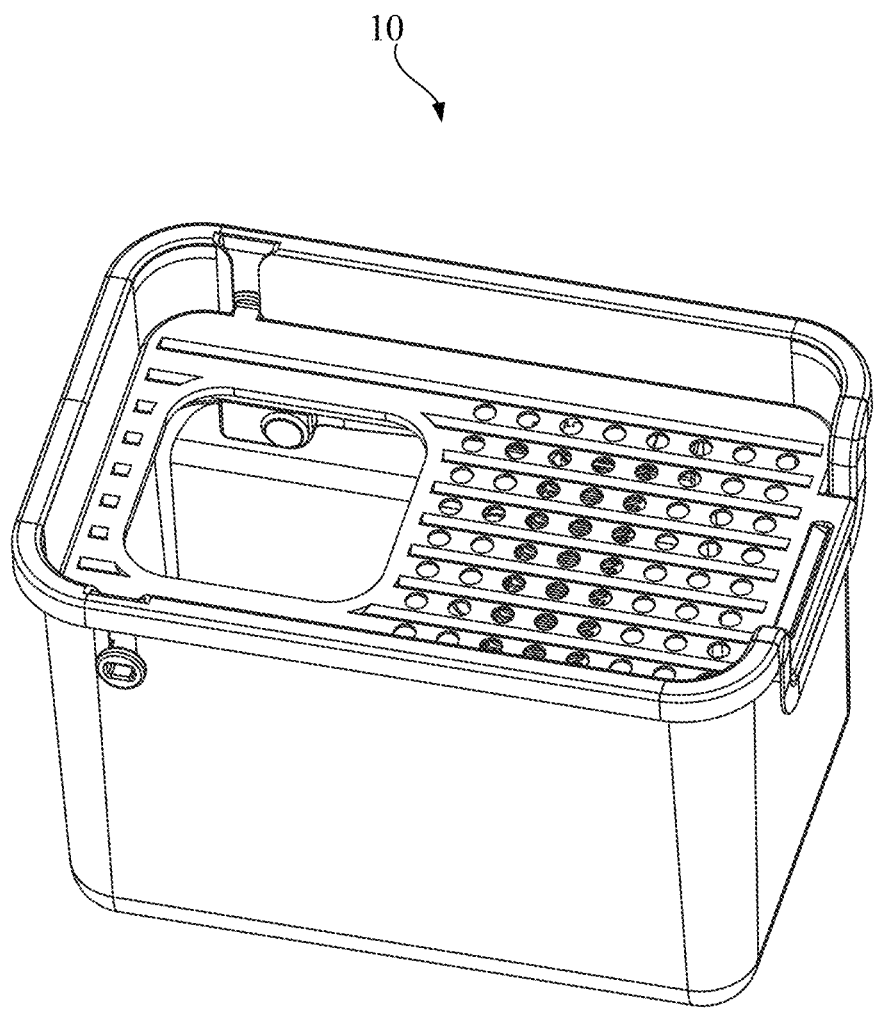
FIG. 1 is an assembly view of a pet toilet according to an embodiment of the present disclosure.

Reference Numerals: 10. pet toilet; 100. litter box; 110. outer litter box; 111. connection notch; 112. mounting hole; 113. locking groove; 120. inner litter box; 200. litter scoop; 210. sieve hole; 220. rake body; 300. collection device; 310. collection opening; 400. driving device; 410. driving force arm; 411. fixing hole; 412. first rod; 413. second rod; 420. driving source component; 421. housing; 4211. mounting slot; 4212. moving element; 422. first driver; 4221. first motor; 423. second driver; 4231. second motor; 4232. gear; 430. guide rail; 431. moving slot; 432. slot; 440. third driver; 441. sleeve; 442. third motor; 4421. hexagonal clamping hole; 443. hexagonal shaft sleeve; 500. cover plate; 510. first end; 511. mounting shaft; 520. second end; 521. locking element; 522. handle groove; 530. pet access hole; and 540. litter drop hole.

DETAILED DESCRIPTION OF THE EMBODIMENTS

To make the above objectives, features and advantages of the present invention more comprehensible, the specific implementations of the present invention are clearly and completely described below with reference to the drawings. Obviously, the specific details described below are only part of the embodiments of the present invention, and the present invention may also be implemented in many other embodiments different from those herein. All other embodiments obtained by those of ordinary skill in the art based on the embodiments of the present invention without creative efforts should fall within the protection scope of the present invention.

It should be noted that when a component is fixed with the other component, the component may be fixed with the other component directly or via an intermediate component. When a component is connected with the other component, the component may be connected with the other component directly or via an intermediate component. The terms "vertical", "horizontal", "left", and "right" and similar expressions used herein are just for illustrative purposes, and do not mean sole implementations.

Unless otherwise defined, all technical and scientific terms used herein have the same meaning as commonly understood by those skilled in the technical field of the present invention. The terms mentioned herein are merely for the purpose of describing specific embodiments, rather than to limit the present invention.

The present disclosure provides pet toilet 10. Referring to FIG. 1, the pet toilet 10 has an automatic cleaning function that can separate a pet litter from a litter clump inside the pet toilet 10. The litter clump refers to a clumped litter formed by pet excrement and the pet litter. It is worth noting that the pet toilet 10 is applied to cat toilets, rabbit toilets, dog toilets, etc., and the specific application scenario of the pet toilet is not limited herein.

Figure 2:
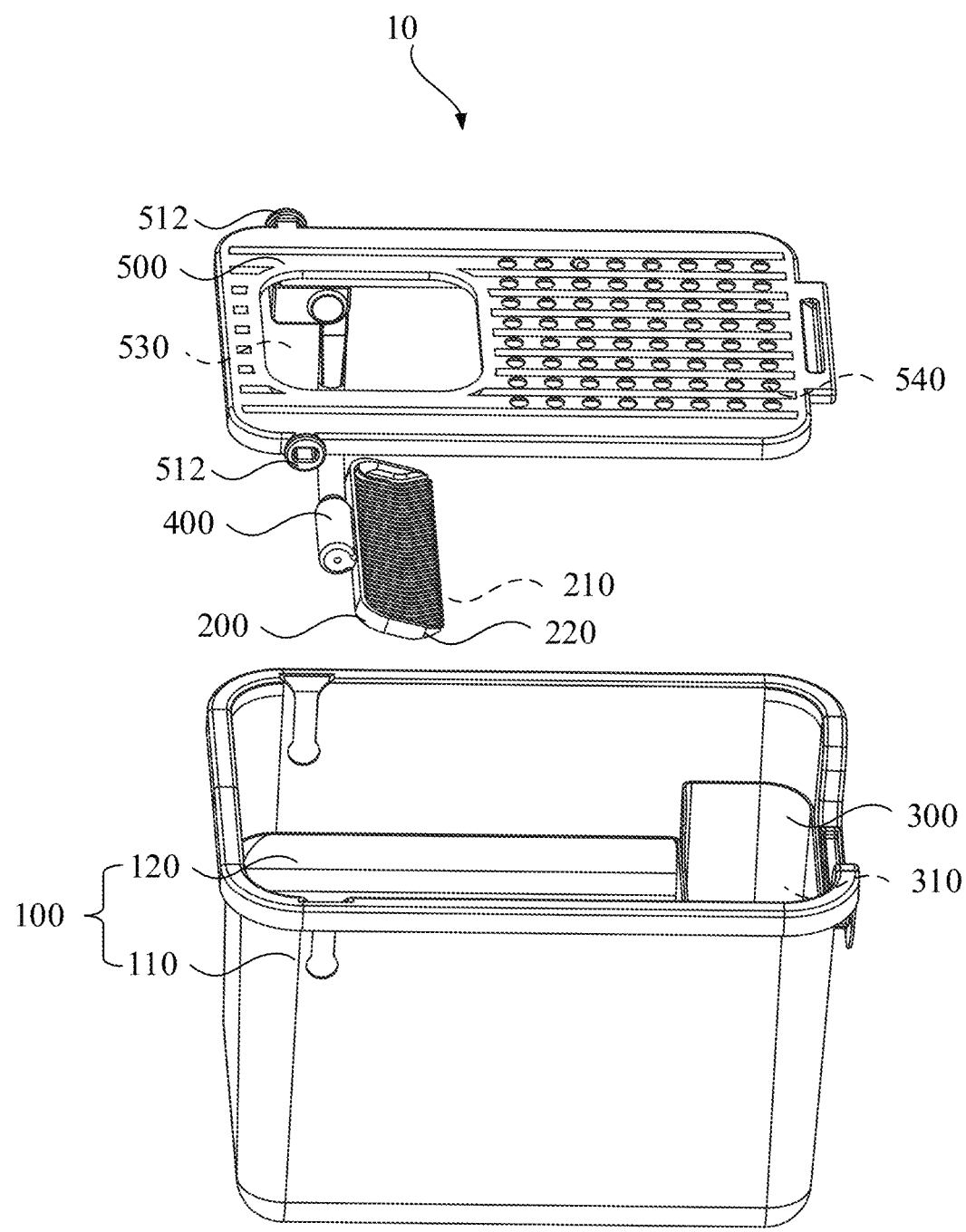
FIG. 2 is an exploded view of the pet toilet shown in FIG. 1.

Referring to FIG. 2, the pet toilet 10 includes litter box 100, litter scoop 200, collection device 300, and driving device 400. The litter box 100 is configured to hold the pet litter. The litter scoop 200 is configured to separate a litter clump from the litter box 100. The collection device 300 is configured to hold the litter clump. The driving device 400 is combined with the litter scoop 200 to form a litter scoop driving device. The driving device 400 is configured to drive the litter scoop 200 to move between two opposite ends of the litter box 100, thereby achieving the separation of the pet litter and the litter clump in the litter box 100. The driving device 400 is further configured to transport the separated litter clump to the collection device 300 outside the litter box 100 for collection, thereby completing the cleaning of the litter box 100. It is worth noting that the driving device 400 can be produced and sold separately as an independent product or component. The driving device 400 produced and sold separately can be used in combination with other components in the pet toilet 10.

In an embodiment, the collection device 300 may only include a collection box. The collection box is provided with collection opening 310, which is configured to receive the litter clump separated by the litter scoop 200. In other embodiments, the collection device 300 may further include a bag delivery mechanism and a sealing mechanism (not shown in the figure). The bag delivery mechanism is configured to transport a waste bag to the collection opening 310. The waste bag transported to the collection opening 310 is configured to collect the litter clump separated by the litter scoop 200. The sealing mechanism includes a fixed mounting bracket. The fixed mounting bracket is provided on collection opening 310. The sealing mechanism is configured to heat-seal the waste bag passing through the collection opening 310 segment by segment, such that the tubular waste bag become waste bag packets connected one by one, making it easy to take and dispose of the waste bag and reduce odors. Alternatively, the collection device 300 can be a guide pipe provided therein with a crushing mechanism. The crushing mechanism is configured to receive and crush the litter clump separated by the litter scoop 200. The guide pipe can guide the crushed litter clump to a sewer of a household toilet. Alternatively, the pet toilet may not be provided with the collection device 300. Instead, the pet toilet 10 is placed next to the household toilet, and the driving device 400 directly removes the litter clump separated by the litter scoop 200 to the household toilet.

The litter box 100 may include an outer litter box 110 and an inner litter box 120. The inner litter box 120 is configured to hold the pet litter. A pet does its business in the inner litter box 120. The inner litter box 120 and the collection device 300 are arranged opposite inside the outer litter box 110. That is, the inner litter box 120 with the pet litter and the collection device 300 are arranged opposite inside the outer litter box 110. To move the pet toilet 10, it is only necessary to simply lift the outer litter box 110, which is convenient for the user to move the pet toilet. It is worth noting that in this embodiment, "outside the litter box 100" refers to "outside the inner litter box 120 for storing the pet litter", and the collection device 300 located in the outer litter box 120 is also considered as located outside the litter box 100. An upper side of the inner litter box 120 is provided with an opening for the pet to enter. Alternatively, a side of the inner litter box is provided with an opening for the pet to enter (a corresponding position of the outer litter box 110 is provided with an opening that matches the inner litter box 120). In addition, the inner litter box 120 can be separated from the outer litter box 110 by a lifting method. The inner litter box 120 can also be separated from the outer litter box 110 by a lateral pulling method. After the inner litter box 120 is separated, the inner litter box 120 can be used separately or cleaned. It is worth noting that the above pet entry methods and the separation methods of the inner litter box 120 can be combined arbitrarily. In other embodiments, the outer litter box 110 may be omitted. Alternatively, a partition can be provided inside a box body to divide the internal space of the box body into two relatively independent chambers, one of which serves as the litter box 100 and the other as the collection device 300.

Figure 3:
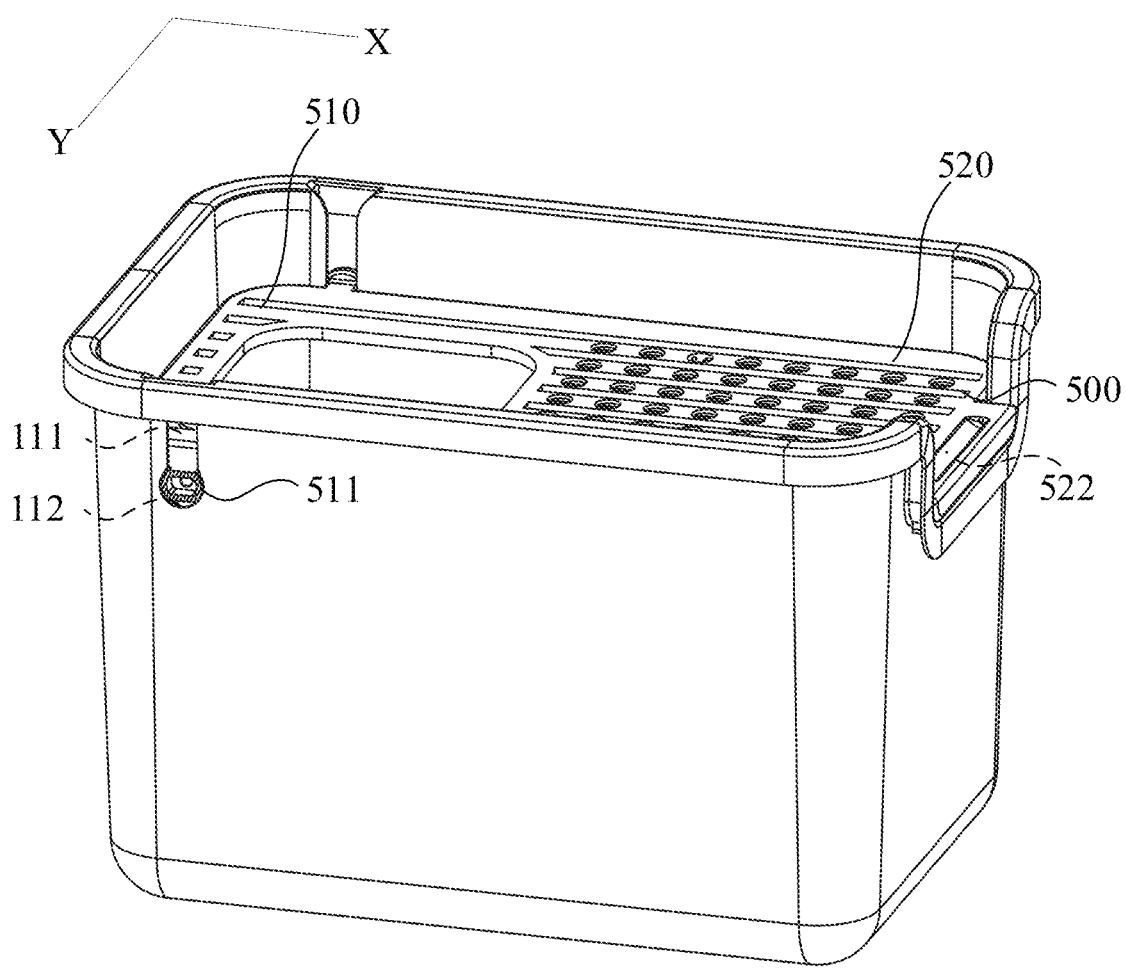
FIG. 3 is a sectional view after a mounting shaft shown in FIG. 1 is fixed into a mounting hole.
Figure 4:
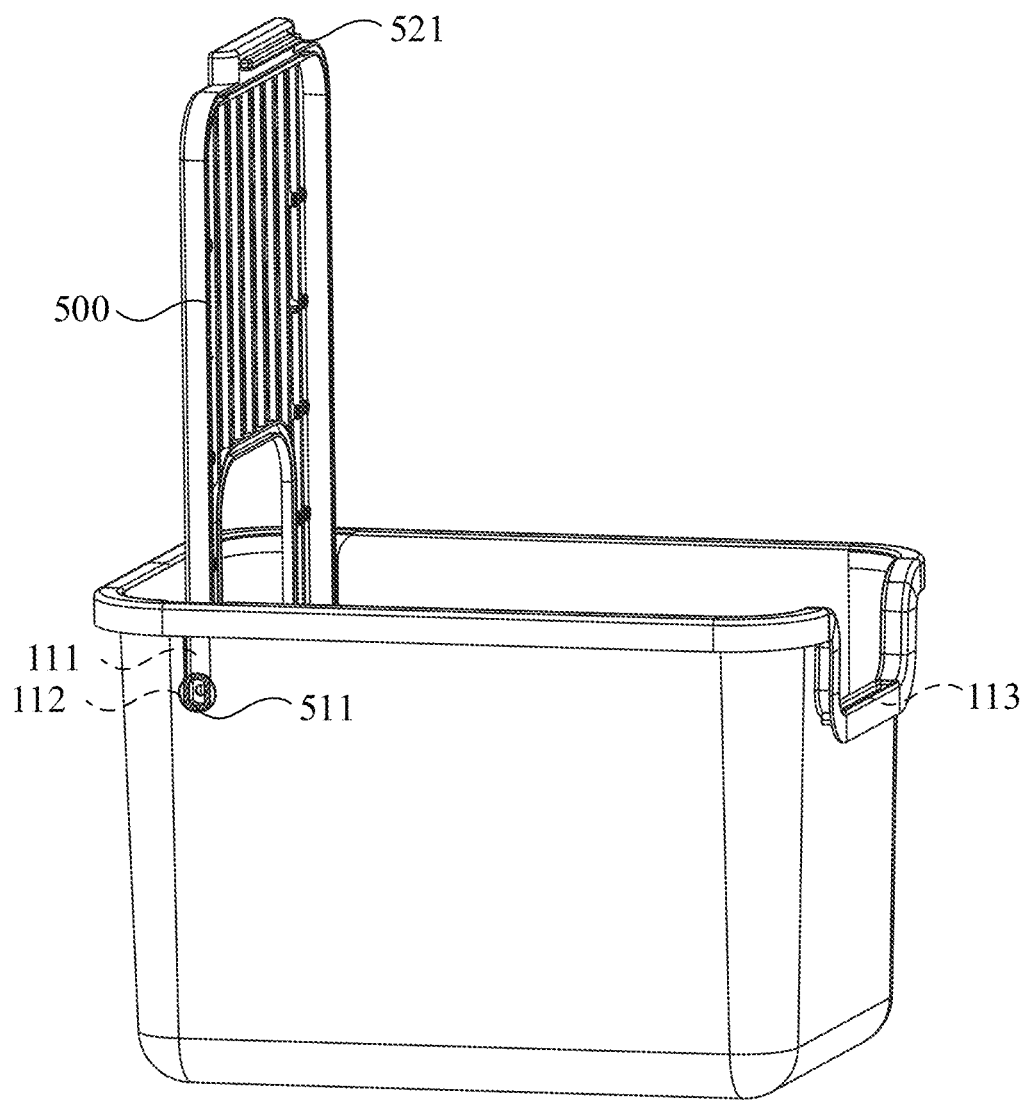
FIG. 4 is a schematic diagram showing that the mounting shaft shown in FIG. 3 is rotatable to detach from the mounting hole.

Referring to FIGS. 3 and 4, the pet toilet 10 may further include cover plate 500. The cover plate 500 is configured to rotatably cover the outer litter box 110. Through the cover plate 500, the inner litter box 120 and the collection device 300 in the outer litter box 110 can be closed or opened. In addition, the cover plate 500 can be quickly disassembled and assembled with the outer litter box 110. Specifically, the cover plate 500 includes first end 510 and second end 520 that are opposite to each other. Two opposite sides of the first end 510 are provided with mounting shafts 511. Two opposite sides of the outer litter box 110 are provided with connection notches 111 and mounting holes 112. The connection notch 111 is communicated with the mounting hole 112. The mounting shaft 511 enters the mounting hole 112 through the connection notch 111 for clamping and fixing. The mounting shaft 511 can be detached from the mounting hole 112 through the connection notch 111. A side of the second end 520 facing the outer litter box 110 is provided with one of locking element 521 and locking groove 113, and the other of the locking element 521 and the locking groove 113 is provided at a side of the outer litter box 110 facing the cover plate 500 (as shown in FIG. 4). The locking element 521 can be engaged with the locking groove 113, thereby achieving relative fixation between the second end 520 and the outer litter box 110. In addition, handle groove 522 can be provided at a side of the second end 520 facing away from the outer litter box 110. The handle groove 522 facilitates the user to rotate the cover plate 500 around a connection between the mounting shaft 511 and the mounting hole 112, thereby allowing the cover plate 500 to close or open the inner litter box 120 and the collection device 300.

In an embodiment, a thickness of the mounting shaft 511 in a length direction (X-direction shown in FIG. 3) is greater than a thickness of the mounting shaft 511 in a width direction (Y-direction shown in FIG. 3). The thickness of the mounting shaft 511 in the width direction is compatible with the connection notch 111. That is, the thickness of the mounting shaft 511 in the width direction is less than or equal to an opening size of the connection notch 111, and the mounting shaft 511 can enter or leave the mounting hole 112 through the connection notch 111 in the width direction (as shown in FIG. 4). The thickness of the mounting shaft 511 in the length direction is greater than the opening size of the connection notch 111. The mounting shaft 511 cannot enter or leave the mounting hole 112 through the connection notch 111 in the length direction, but a diameter of the mounting hole 112 is greater than or equal to the thickness of the mounting shaft 511 in the length direction. Therefore, the mounting shaft 511 is rotatable in the mounting hole 112 (as shown in FIG. 3). In this embodiment, to disassemble and assemble the cover plate 500 and the outer litter box 110, the mounting shaft 511 needs to be rotated until it aligns with the connection notch 111 in the width direction. At this point, the mounting shaft 511 can quickly enter or detach from the mounting hole 112. Before disassembly, the cover plate 500 needs to be rotated to a specific angle relative to the outer litter box 110. When entering the mounting hole 112, the mounting shaft 511 is rotated inside the mounting hole 112 until it aligns with the connection notch 111 in the length direction. At this point, the mounting shaft 511 is fixed inside the mounting hole 112 (as shown in FIG. 3). In other embodiments, the outer litter box 110 may only be provided with the connection notch 111. The opening size of the connection notch 111 is larger than the thickness of the mounting shaft 511 in any direction, that is, the mounting shaft 511 can freely enter or leave the connection notch 111.

Figure 5:
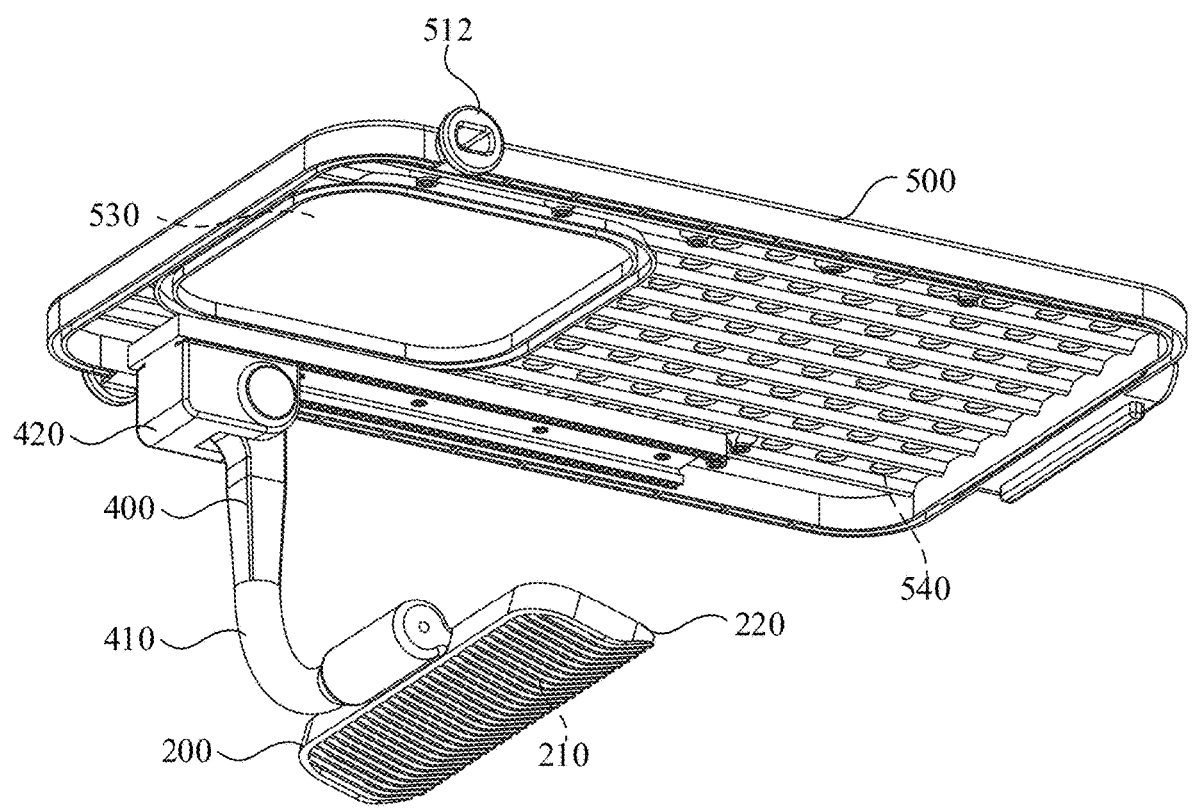
FIG. 5 is an assembly view of a driving device shown in FIG. 1 in a working state.

Referring to FIG. 5, in an embodiment, stopper 512 is provided at a side of the mounting shaft 511 away from the cover plate 500. A size of the stopper 512 is larger than that of the mounting hole 112. The stopper 512 is configured to prevent the mounting shaft 511 from accidentally slipping from the mounting hole 112 into the litter box 100, thereby enhancing the stability of the connection between the mounting shaft 511 and the mounting hole 112.

In an embodiment, the cover plate 500 is provided with pet access hole 530 facing the inner litter box 120. The pet can enter the inner litter box 120 for excretion through the pet access hole 530. In addition, the cover plate 500 can further be provided with litter drop holes 540 around the pet access hole 530. When the pet jumps out of the inner litter box 120 to the cover plate 500, the pet litter carried out returns back to the inner litter box 120 or the collection device 300 through the litter drop holes 540, thereby reducing the amount of pet litters carried out by the pet.

The litter scoop 200 can be configured as rake body 220 with a plurality of sieve holes 210. When the rake body 220 passes through a pet litter and litter clump mixture, the pet litter moves from one side of the rake body 220 to the other side of the rake body 220 through the sieve hole 210. The litter clump with a relatively large volume cannot be screened through the sieve hole 210 to the same side of the rake body 220, thereby separating the litter clump from the pet litter. In other embodiments, the litter scoop 200 can also be configured as a mechanical claw (not shown in the figure) for picking up the litter clump from the pet litter, thereby achieving the separation of the pet litter and the litter clump.

The process that the driving device 400 drives the litter scoop 200 to remove the litter clump from the inner litter box 120 to the collection device 300 is described in detail below according to the drawings.

Referring to FIG. 5, the driving device 400 includes driving force arm 410 and driving source component 420. One end of the driving force arm 410 is rotatably connected to the litter scoop 200, and the other opposite end of the driving force arm 410 is rotatably connected to the driving source component 420. The driving force arm 410 is preferably an L-shaped rod.

The one end of the driving force arm 410 is rotatable around the driving source component 420 to move the other opposite end between the two opposite ends of the litter box 100, thereby driving the litter scoop 200 through the driving force arm 410 to separate the litter clump from the litter box 100. In addition, the driving source component 420 can further drive the driving force arm 410 to rotate so as to lift the litter scoop 200. The lifted litter scoop 200 can move to the collection opening 310 located outside the litter box. The litter scoop 200 located at the collection opening 310 can rotate relative to the driving force arm 410 so as to dump the litter clump separated by the litter scoop 200 into the collection device 300.

It is worth noting that in order to completely separate the pet litter and the litter clump with the litter scoop 200, when the other opposite end of the driving force arm 410 moves between the two opposite ends of the litter box 100, the litter scoop 200 remains in abutting against a bottom of the inner litter box 120. The contact is not an absolute contact. For example, in a contact case, there is a slight distance between the litter scoop 200 and the bottom of the inner litter box 120, but it does not affect the separation of all pet litter and litter clump mixtures by the litter scoop 200. In addition, when the driving force arm 410 moves between the two opposite ends of the litter box 100, the litter scoop 200 can also move from one end of the inner litter box 120 in the length direction to the other opposite end thereof, that is, the litter scoop 200 can separate the pet litter at any position in the length direction of the inner litter box 120.

Figure 6:
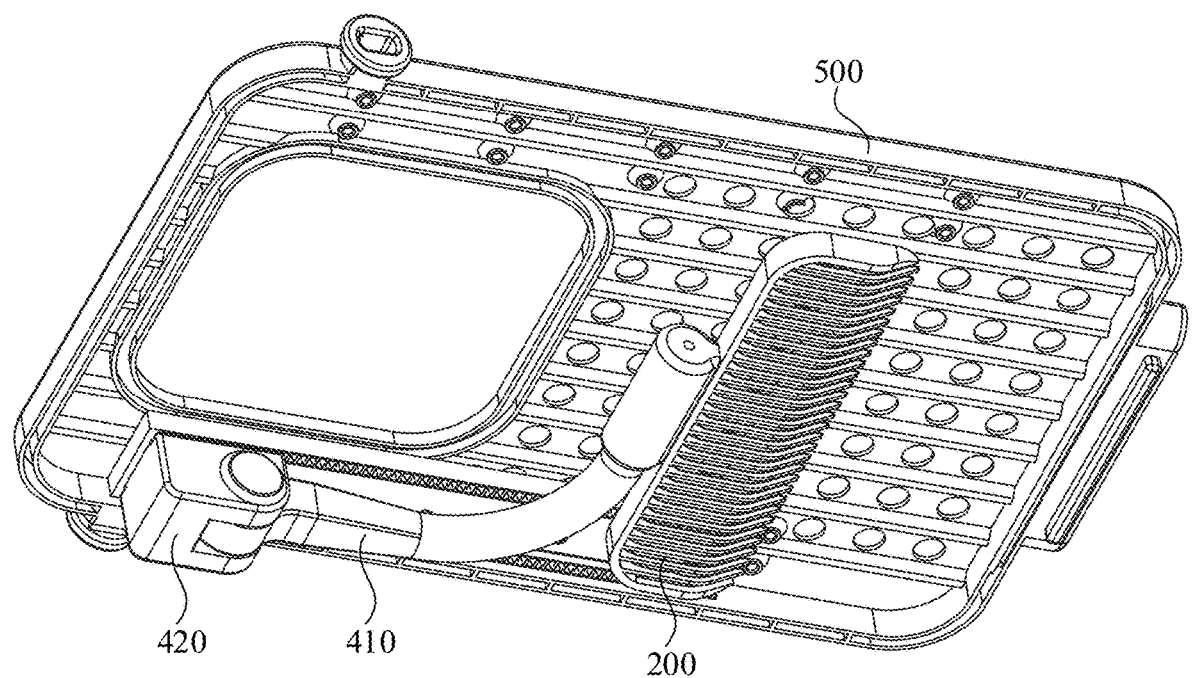
FIG. 6 is an assembly view of the driving device shown in FIG. 1 in a storage state.

The driving force arm 410 rotates relative to the driving source component 420 to switch the pet toilet 10 between a working state and a storage state. In the working state, the litter scoop 200 abuts against the bottom of the litter box 102. In the storage state, the driving force arm 410 rotates around the driving source component 420 until it is flush with the cover plate 500, and the litter scoop 200 rotates around the driving force arm 410 until it is flush with the cover plate 500 (as shown in FIG. 6). The driving force arm 410 and the litter scoop 200 as far away as possible from the inner litter box 120 to avoid occupying the pet excretion space and affecting pet excretion.

Figure 7:
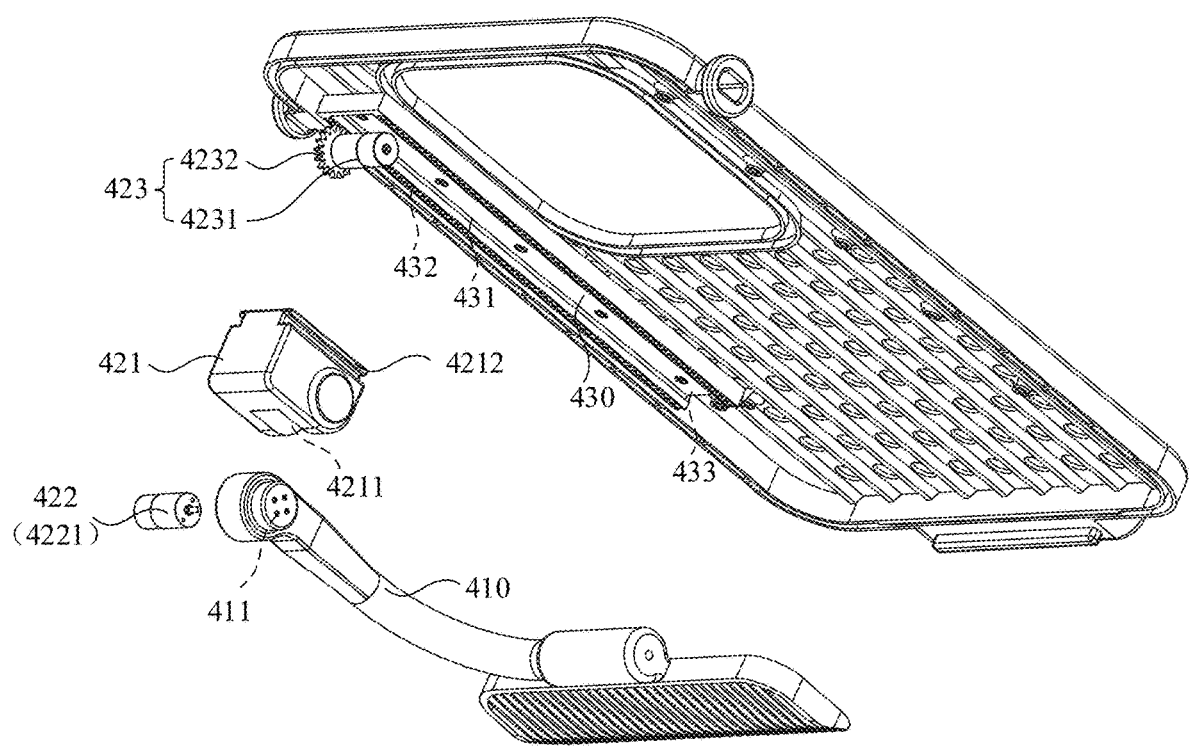
FIG. 7 is an exploded view of the driving device shown in FIG. 6.

Referring to FIG. 7, in an embodiment, the driving source component 420 includes housing 421 and first driver 422. The first driver 422 is provided in the housing 421. An output end of the first driver 422 is connected to the driving force arm 410, thereby driving the driving force arm 410 to rotate. Specifically, the housing 421 is provided with mounting slot 4211 for mounting the first driver 422. The mounting slot 4211 is communicated with an exterior of the housing 421. The first driver 422 is located in the mounting slot 4211. The driving force arm 410 is fitted onto the first driver 422, and the driving force arm 410 is rotatable within the mounting slot 4211. The first driver 422 includes first motor 4221 and an adapter (not shown in the figure). An output end of the first motor 4221 is fixed to one end of the adapter in a circumferential direction. The driving force arm 410 is provided with a plurality of fixing holes 411 facing the first motor 4221 and arranged in a circumferential direction. The other end of the adapter is inserted into the fixing hole 411 of the driving force arm 410 for fixation.

The movement of the other opposite end of the driving force arm 410 between the two opposite ends of the litter box 100 can be as follows: the housing 421 moves above the litter box 100, thereby driving the driving force arm 410 provided on the housing 421 to move. Specifically, the driving device 400 further includes guide rail 430. The guide rail 430 can be located at a side of the cover plate 500 facing the litter box 100. The guide rail 430 and the cover plate 500 can be connected by a threaded means. The guide rail 430 and the cover plate 500 are provided with threaded holes, and the guide rail and the cover plate are connected through a threaded connector. Alternatively, the guide rail 430 can be integrally formed with the cover plate 500. The housing 421 is movably provided on the guide rail 430. The movable method can be as follows: one of the guide rail 430 and the housing 421 is provided with moving slot 431, and the other of the guide rail 430 and the housing 421 is provided with moving element 4212, and the moving element 4212 is engaged with the moving slot 431 and movable inside the moving slot 431. The movement of the housing 421 on the guide rail 430 causes the driving force arm 410 to move between the two opposite ends of the litter box 100. In other embodiments, the guide rail 430 may be provided on a side wall of the litter box 100.

The driving device 400 further includes second driver 423. The second driver 423 drives the housing 421 to move on the guide rail 430. Specifically, the guide rail 430 is provided with a plurality of slots 432 in a length direction, and the second driver 423 is provided in the housing 421. The second driver 423 includes second motor 4231 and gear 4232. An output end of the second motor 4231 is connected to the gear 4232. The gear 4232 can be exposed to the housing 421 and mesh with the slots 432. The second motor 4231 drives the gear 4232 to move along the length direction of the guide rail 430, thereby driving the housing 421 to move on the guide rail 430. In other embodiments, gear 4232 can be replaced with a rubber wheel (not shown in the figure). In this embodiment, the guide rail 430 may not be provided with the slots 432, and the rubber wheel directly abuts against the guide rail 430. The output end of the second motor 4231 is connected to the rubber wheel. The second motor 4231 can drive the rubber wheel to move on the guide rail 430, thereby driving the housing 421 to move on the guide rail 430. Alternatively, the second driver 423 may include the second motor 4231 and a screw (not shown in the figure). The output end of the second motor 4231 is connected to one end of the screw, and the other end of the screw is connected to the housing 421. The second motor 4231 drives the screw to push the housing 421 to move on the guide rail 430. In this embodiment, the second driver 423 is provided on an inner wall of the litter box 100.

In an embodiment, at least one end of the guide rail 430 in the length direction is provided with notch 433. The housing 421 can detach from the guide rail 430 through the notch 433, allowing components such as the driving force arm 410 and the litter scoop 200 associated with the housing 421 to detach from the guide rail 430. The design is convenient for the user to replace and maintain the parts, and after the driving device 400 and the litter scoop 200 are removed, the pet toilet 10 can still be used independently.

Figure 8:
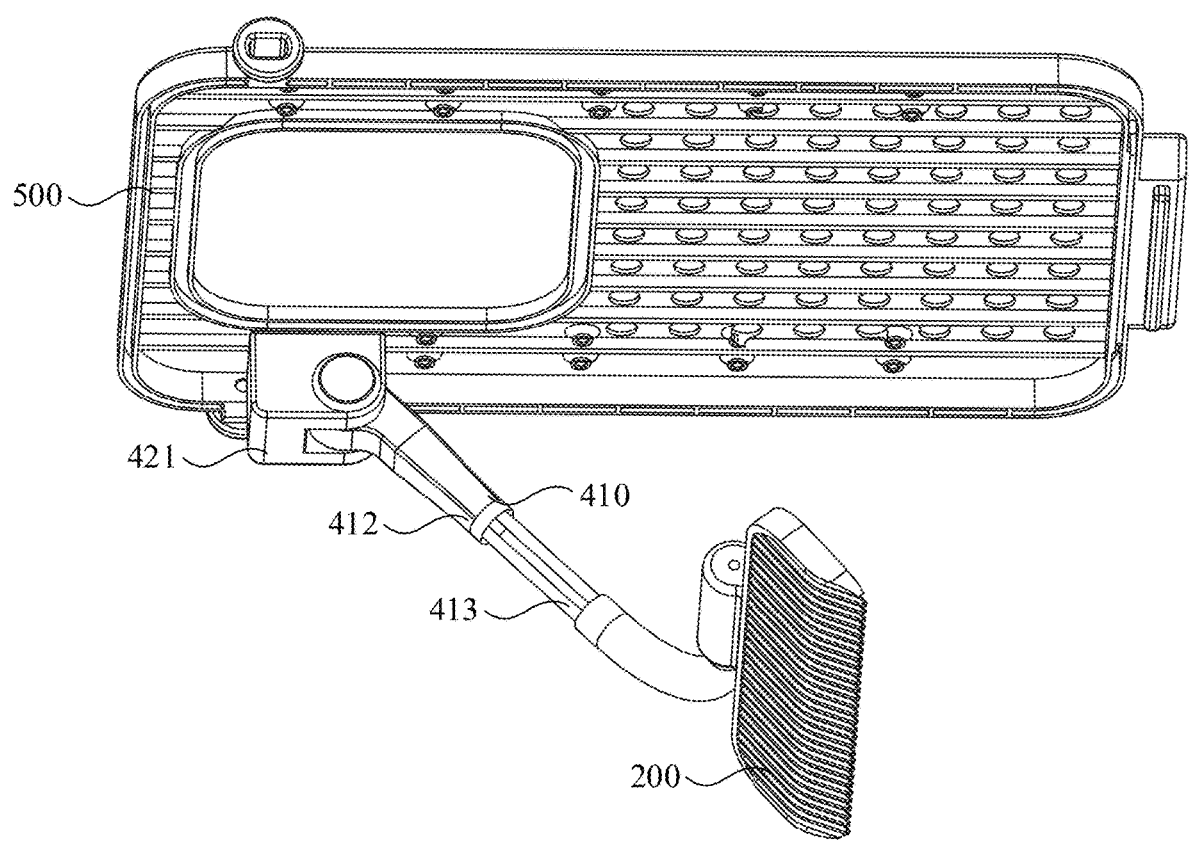
FIG. 8 is a structural diagram showing that a driving force arm shown in FIG. 7 is a telescopic rod.

The movement of the other opposite end of the driving force arm 410 between the two opposite ends of the litter box 100 can be as follows: the housing 421 is fixed above the litter box 100, and the driving force arm 410 is rotatable relative to the housing 421 to change its length for moving. Specifically, the driving force arm 410 can be a telescopic rod (as shown in FIG. 8). The driving force arm 410 includes first rod 412 and second rod 413. The first rod 412 is provided with a telescopic chamber (not shown in the figure), and the second rod 413 is movable in the telescopic chamber. The first rod 412 is rotatably connected to the housing 421. The second rod 413 is rotatably connected to the litter scoop 200. When the litter scoop 200 moves between the two opposite ends of the litter box 100, the second rod 413 moves correspondingly in the telescopic chamber to keep the litter scoop 200 in abutting against the bottom of the litter box 100. Alternatively, the driving force arm 410 can be a folding rod (not shown in the figure). The driving force arm includes a third rod and a fourth rod. The third rod is rotatable relative to the fourth rod, such that the third rod is stacked on top of the fourth rod. The third rod is rotatably connected to the housing 421. The fourth rod is rotatably connected to the litter scoop 200. When the litter scoop 200 moves between the two opposite ends of the litter box 100, the third rod and the fourth rod rotate accordingly to keep the litter scoop 200 in abutting against the bottom of the litter box 100. It is worth noting that in the embodiment where the driving force arm 420 is a folding rod or a telescopic rod, a driver is provided inside the driving force arm 410 to drive the driving force arm 410 to rotate relative to the housing 421, and the housing 421 may not be provided with the first driver 422.

Figure 9:
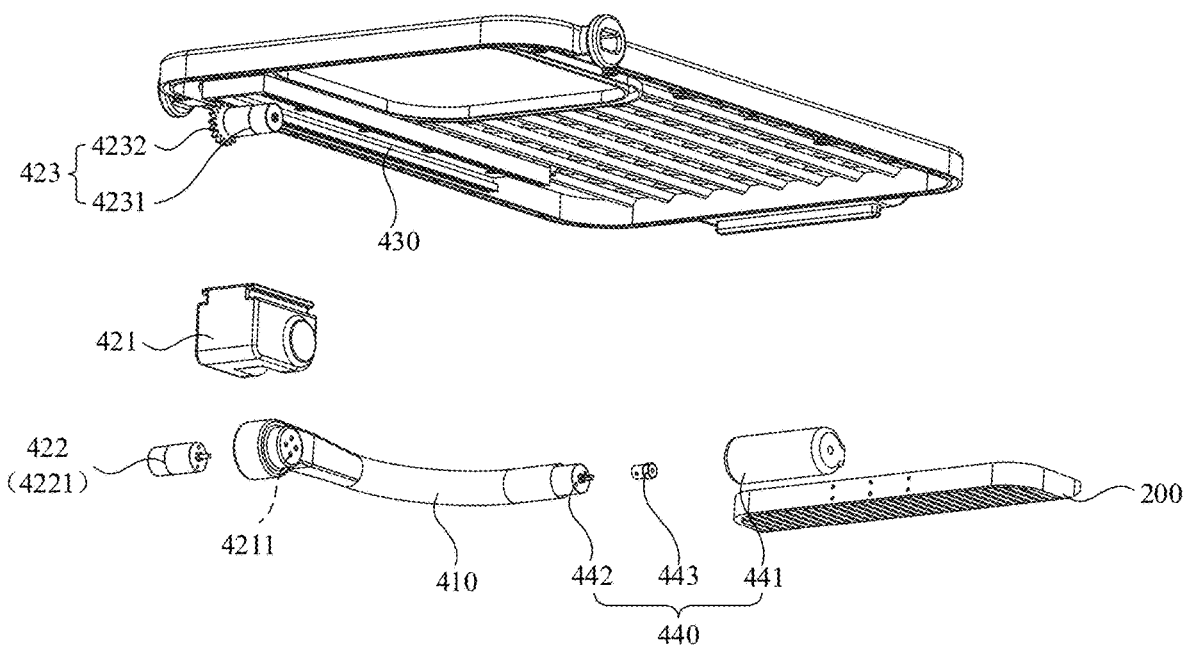
FIG. 9 is an exploded view of a third driver shown in FIG. 7.
Figure 10:
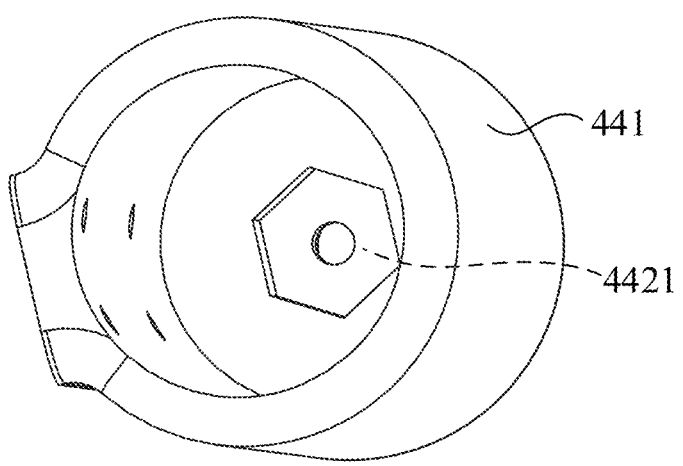
FIG. 10 is a structural diagram of a sleeve shown in FIG. 9 from another perspective.

Referring to FIG. 9, in an embodiment, the driving device 400 further includes third driver 440. The third driver 440 is located on the driving force arm 410. An output end of the third driver 440 is connected to the litter scoop 200. The third driver 440 is configured to drive the litter scoop 200 to rotate relative to the driving force arm 410. Specifically, the third driver 440 includes sleeve 441 and third motor 442. The sleeve 441 is fitted onto an output end of the third motor 442, and the sleeve 441 is fixed to the output end of the third motor 442 in a circumferential direction. The fixed connection in the circumferential direction can be achieved as follows. The output end of the third motor 442 is provided with hexagonal shaft sleeve 443. The sleeve 441 faces the third motor 442 and is provided with hexagonal clamping hole 4411 (as shown in FIG. 10). The hexagonal shaft sleeve 443 includes one end connected to the output end of the third motor 442 and the other end clamped into the hexagonal clamping hole 4411. The sleeve 441 is fixedly connected to the litter scoop 200. The fixed connection can be achieved as follows. The sleeve 441 and the litter scoop 200 are provided with threaded holes, and the relative fixed connection between the sleeve and the litter scoop is achieved through a threaded connector.

In an embodiment, sensors (such as infrared sensors, photoelectric sensors, laser sensors, ultrasonic radar, and millimeter-wave radar) can be arranged inside the housing 421 to detect the states of the pet entering and exiting the pet toilet 10 and to detect its excretion.

In an embodiment, the pet toilet 10 can further have a disinfection function to disinfect the pet litter in the litter box 100. Specifically, the pet toilet 10 can achieve the disinfection function through an ultraviolet disinfection lamp. The ultraviolet disinfection lamp is located above the litter box 100. For example, the ultraviolet disinfection lamp can be provided on the cover plate 500 directly above the litter box 100. Alternatively, the ultraviolet disinfection lamp can be provided on an upper side wall of the litter box 100. The ultraviolet disinfection lamp is configured to disinfect the pet litter. In other embodiments, the pet toilet 10 may further be provided with an automatic liquid spraying mechanism for spraying a disinfectant to disinfect the pet litter. In addition, the pet device 10 may further have an odor control function to remove odors from the litter box 100, preventing excessive odors from affecting pet excretion. Specifically, activated carbon can be provided inside the litter box 100 to absorb odors, and an air freshener can also be sprayed into the litter box 100 to remove odors.

In the pet toilet 10 using the above driving device, the driving device 400 drives the litter scoop 200 to move between the two opposite ends of the litter box 100, achieving the separation of the pet litter and litter clump in the litter box 100, thereby completing the automatic cleaning of the pet toilet 10. The pet toilet 10 can achieve automatic cleaning without flipping the litter box, so the side wall of the pet toilet 10 is not easily contaminated with excrement. In addition, the pet toilet 10 uses a lifting method to lift the litter scoop 200 to the collection opening 310 of the collection device 300. The collection device 310 is located at a position above the litter box 100, increasing the capacity of the collection device 310 and reducing odors moving from the collection device 310 to the litter box 100 to affect pet excretion. In addition, since the driving force arm 410, the driving source component 420, and the litter scoop 200 are all rotatably connected, the litter scoop 200 can move to any position in the litter box 100. The design achieves high overall freedom and is suitable for various usage scenarios. For example, when the pet excretes, the litter scoop 200 and the driving force arm 410 is moved to a position above the litter box 100, without occupying the space for the pet to use in the litter box 100, reducing the impact of the litter scoop 200 and the driving force arm 410 on pet excretion. When the pet toilet 10 starts automatically cleaning the litter clump, the litter scoop 200 can clean various positions inside the litter box 100, reducing the probability of residual litter clumps and achieving thorough cleaning. After the litter clump is removed from the litter box 100, the driving device 400 further drives the litter scoop 200 to reciprocate in the litter box 100 so as to level the pet litter in the litter box 100, preventing the pet litter in the litter box 100 from concentrating in a specific position and affecting pet excretion.

The technical characteristics of the above embodiments may be employed in arbitrary combinations. In an effort to provide a concise description of these embodiments, all possible combinations of all technical characteristics of the embodiments may not be described. However, these combinations of technical characteristics should be construed as disclosed in the description in case no contradiction occurs.

The above embodiments are intended to illustrate several implementations of the present invention in detail, and they should not be construed as a limitation to the patentable scope of the present invention. It should be pointed out that those of ordinary skill in the art may further make several modifications, substitutions and improvements without departing from the concept of the present invention, which should be covered by the scope of protection of the present invention. Therefore, the protection scope of the present invention should be subject to the claims.

What is claimed is:

1. A pet toilet, comprising:
a litter box, configured to hold a pet litter; and
a litter scoop driving device, located in the litter box, and configured to drive a litter scoop to move in the litter box to separate a litter clump from the litter box;
wherein the litter scoop driving device comprises a housing, a driving force arm, the litter scoop, a guide rail, and a motor unit; a first end of the driving force arm is rotatably connected to the litter scoop, and an opposite second end of the driving force arm is rotatably connected to the housing; and the guide rail is directly or indirectly provided on the litter box; and
the motor unit comprises a first motor, a second motor, and a third motor; the first motor is located on the housing; an output end of the first motor is connected to the driving force arm to drive the driving force arm to rotate relative to the housing; the second motor is located on the housing; an output end of the second motor is connected to the guide rail; the second motor is configured to drive the litter scoop driving device to move in a length direction of the guide rail, thereby driving the litter scoop to move between a first end and an opposite second end of the litter box; the third motor is located on the driving force arm; an output end of the third motor is connected to the litter scoop to drive the litter scoop to rotate relative to the driving force arm; under an action of the first motor, the litter scoop is lifted; under an action of the second motor, the litter scoop moves from the first end of the litter box to the opposite second end of the litter box; and under an action of the third motor, the litter scoop dumps the litter clump.

2. The pet toilet according to claim 1, wherein the second motor is connected to the guide rail through a gear, a rubber wheel or a screw, such that the litter scoop is movable from the first end of the litter box to the opposite second end of the litter box.

3. The pet toilet according to claim 1, wherein at least one end of the guide rail in the length direction is provided with a notch; the housing is configured to detach from the guide rail through the notch; and when the housing detaches from the guide rail through the notch, the litter scoop driving device detaches from the guide rail.

4. The pet toilet according to claim 1, wherein the housing is provided with a mounting slot for mounting the first motor; the mounting slot is communicated with an exterior of the housing; the first motor is located in the mounting slot; the driving force arm is fitted onto the first motor; and an end of the driving force arm is fitted onto the first motor and is rotatable within the mounting slot; and
the litter scoop driving device further comprises an adapter; the output end of the first motor is fixed to a first end of the adapter in a circumferential direction; the driving force arm is provided with a plurality of fixing holes facing the first motor and arranged in a circumferential direction; and a second end of the adapter is inserted into a fixing hole of the plurality of fixing holes of the driving force arm for fixation.

5. The pet toilet according to claim 1, wherein the litter scoop driving device further comprises a sleeve; the sleeve is fitted onto the output end of the third motor; the sleeve and the output end of the third motor are fixed in a circumferential direction; and the sleeve is fixedly connected to the litter scoop.

6. The pet toilet according to claim 1, wherein the pet toilet comprises a cover plate; each of two opposite sides of the cover plate is provided with a mounting shaft; each of two sides of the litter box is provided with a connection notch and a mounting hole; the connection notch is communicated with the mounting hole; and the mounting shaft is provided in the mounting hole through the connection notch.

7. The pet toilet according to claim 6, wherein a thickness of the mounting shaft in a length direction is greater than a thickness of the mounting shaft in a width direction; the thickness of the mounting shaft in the width direction is less than or equal to an opening size of the connection notch; the mounting shaft is configured to enter or detach from the mounting hole through the connection notch in the width direction; the thickness of the mounting shaft in the length direction is greater than the opening size of the connection notch; the mounting shaft is not configured to enter or detach from the mounting hole through the connection notch in the length direction; a diameter of the mounting hole is greater than or equal to the thickness of the mounting shaft in the length direction; and the mounting shaft is rotatable in the mounting hole.

8. The pet toilet according to claim 6, wherein the driving force arm is rotatable relative to the housing to switch the pet toilet between a working state and a storage state;
in the working state, the litter scoop abuts against a bottom of the litter box; and
in the storage state, the driving force arm rotates around the housing to be flush with the cover plate.

9. A pet toilet, comprising:
a litter box, configured to hold a pet litter; and
a litter scoop driving device, located in the litter box, and configured to drive a litter scoop to move in the litter box to separate a litter clump from the litter box;
wherein the litter scoop driving device comprises a housing, a driving force arm, the litter scoop, and a motor unit; a first end of the driving force arm is rotatably connected to the litter scoop, and an opposite second end of the driving force arm is rotatably connected to the housing; the driving force arm comprises two rods, wherein the two rods are relatively telescopic in an axial direction; and through relative telescopic motion of the two rods, an axial length of the driving force arm increases or decreases; and
the motor unit comprises a first motor and a third motor; the first motor is located on the housing; an output end of the first motor is connected to the driving force arm to drive the driving force arm to rotate relative to the housing; the third motor is located on the driving force arm; an output end of the third motor is connected to the litter scoop to drive the litter scoop to rotate relative to the driving force arm; under an action of the first motor, the litter scoop is tilted and lifted; when the litter scoop is tilted and lifted, the driving force arm extends, the litter scoop remains in abutting against a bottom of the litter box, and the litter scoop moves from a first end of the litter box to a second end of the litter box; and under an action of the third motor, the litter scoop dumps the litter clump.

10. The pet toilet according to claim 9, wherein the housing is provided with a mounting slot for mounting the first motor; the mounting slot is communicated with an exterior of the housing; the first motor is located in the mounting slot; the driving force arm is fitted onto the first motor; and an end of the driving force arm is fitted onto the first motor and is rotatable within the mounting slot; and
the litter scoop driving device further comprises an adapter; the output end of the first motor is fixed to a first end of the adapter in a circumferential direction; the driving force arm is provided with a plurality of fixing holes facing the first motor and arranged in a circumferential direction; and a second end of the adapter is inserted into a fixing hole of the plurality of fixing holes of the driving force arm for fixation.

11. The pet toilet according to claim 9, wherein the litter scoop driving device further comprises a sleeve; the sleeve is fitted onto the output end of the third motor; the sleeve and the output end of the third motor are fixed in a circumferential direction; and the sleeve is fixedly connected to the litter scoop.

12. The pet toilet according to claim 9, wherein the pet toilet comprises a cover plate; each of two opposite sides of the cover plate is provided with a mounting shaft; each of two sides of the litter box is provided with a connection notch and a mounting hole; the connection notch is communicated with the mounting hole; and the mounting shaft is provided in the mounting hole through the connection notch.

13. The pet toilet according to claim 12, wherein a thickness of the mounting shaft in a length direction is greater than a thickness of the mounting shaft in a width direction; the thickness of the mounting shaft in the width direction is less than or equal to an opening size of the connection notch; the mounting shaft is configured to enter or detach from the mounting hole through the connection notch in the width direction; the thickness of the mounting shaft in the length direction is greater than the opening size of the connection notch; the mounting shaft is not configured to enter or detach from the mounting hole through the connection notch in the length direction; a diameter of the mounting hole is greater than or equal to the thickness of the mounting shaft in the length direction; and the mounting shaft is rotatable in the mounting hole.

14. The pet toilet according to claim 12, wherein the driving force arm is rotatable relative to the housing to switch the pet toilet between a working state and a storage state;
in the working state, the litter scoop abuts against the bottom of the litter box; and
in the storage state, the driving force arm rotates around the housing to be flush with the cover plate.

15. A pet toilet, comprising:
a litter box, configured to hold a pet litter; and
a litter scoop driving device, located in the litter box, and configured to drive a litter scoop to move in the litter box to separate a litter clump from the litter box;
wherein the litter scoop driving device comprises a housing, a driving force arm, the litter scoop, and a motor unit; a first end of the driving force arm is rotatably connected to the litter scoop, and an opposite second end of the driving force arm is rotatably connected to the housing; the driving force arm comprises two rods, wherein the two rods are axially connected and rotatable to change an angle; and through relative rotation of the two rods, the litter scoop remains continuously in abutting against a bottom of the litter box; and
the motor unit comprises a first motor and a third motor; the first motor is located on the housing; an output end of the first motor is connected to the driving force arm to drive the driving force arm to rotate relative to the housing; the third motor is located on the driving force arm; an output end of the third motor is connected to the litter scoop to drive the litter scoop to rotate relative to the driving force arm; under an action of the first motor, the litter scoop is tilted and lifted; when the litter scoop is tilted and lifted, the angle between the two rods changes, the litter scoop remains in abutting against the bottom of the litter box, and the litter scoop moves from a first end of the litter box to a second end of the litter box; and under an action of the third motor, the litter scoop dumps the litter clump.

16. The pet toilet according to claim 15, wherein the housing is provided with a mounting slot for mounting the first motor; the mounting slot is communicated with an exterior of the housing; the first motor is located in the mounting slot; the driving force arm is fitted onto the first motor; and an end of the driving force arm is fitted onto the first motor and is rotatable within the mounting slot; and
the litter scoop driving device further comprises an adapter; the output end of the first motor is fixed to a first end of the adapter in a circumferential direction; the driving force arm is provided with a plurality of fixing holes facing the first motor and arranged in a circumferential direction; and a second end of the adapter is inserted into a fixing hole of the plurality of fixing holes of the driving force arm for fixation.

17. The pet toilet according to claim 15, wherein the litter scoop driving device further comprises a sleeve; the sleeve is fitted onto the output end of the third motor; the sleeve and the output end of the third motor are fixed in a circumferential direction; and the sleeve is fixedly connected to the litter scoop.

18. The pet toilet according to claim 15, wherein the pet toilet comprises a cover plate; each of two opposite sides of the cover plate is provided with a mounting shaft; each of two sides of the litter box is provided with a connection notch and a mounting hole; the connection notch is communicated with the mounting hole; and the mounting shaft is provided in the mounting hole through the connection notch.

19. The pet toilet according to claim 18, wherein a thickness of the mounting shaft in a length direction is greater than a thickness of the mounting shaft in a width direction; the thickness of the mounting shaft in the width direction is less than or equal to an opening size of the connection notch; the mounting shaft is configured to enter or detach from the mounting hole through the connection notch in the width direction; the thickness of the mounting shaft in the length direction is greater than the opening size of the connection notch; the mounting shaft is not configured to enter or detach from the mounting hole through the connection notch in the length direction; a diameter of the mounting hole is greater than or equal to the thickness of the mounting shaft in the length direction; and the mounting shaft is rotatable in the mounting hole.

20. The pet toilet according to claim 18, wherein the driving force arm is rotatable relative to the housing to switch the pet toilet between a working state and a storage state;

in the working state, the litter scoop abuts against the bottom of the litter box; and in the storage state, the driving force arm rotates around the housing to be flush with the cover plate.

* * * * *